United States Patent [19]
Paselt

[11] Patent Number: 4,856,629
[45] Date of Patent: Aug. 15, 1989

[54] BRAKE ACTUATING MECHANISM FOR BICYCLES WITH MULTI-SPEED CHAIN DRIVE

[76] Inventor: Artur Paselt, Weinheimer Strasse 71, 6804 Ilvesheim, Fed. Rep. of Germany

[21] Appl. No.: 120,082

[22] Filed: Nov. 12, 1987

Related U.S. Application Data

[63] Continuation-in-part of Ser. No. 433,983, Jan. 21, 1983, abandoned.

[30] Foreign Application Priority Data

Jul. 12, 1982 [DE] Fed. Rep. of Germany ....... 3226037

[51] Int. Cl.[4] .......................... B60K 41/26; B62L 5/00
[52] U.S. Cl. ......................................... 192/5; 188/24.17
[58] Field of Search .................. 192/5, 6 R, 6 A, 6 B; 188/24.17, 82.7

[56] References Cited

U.S. PATENT DOCUMENTS

| | | | |
|---|---|---|---|
| 3,966,229 | 6/1976 | Foster | 188/24.17 X |
| 4,030,774 | 6/1977 | Foster | 188/24.17 X |
| 4,093,261 | 6/1978 | Persson | 192/5 X |
| 4,134,481 | 1/1979 | Calderazzo | 188/24.17 X |
| 4,260,044 | 4/1981 | Foster | 188/24.17 X |
| 4,261,449 | 4/1981 | Foster | 188/24.17 X |
| 4,638,890 | 1/1987 | Lohman | 188/24.17 |

Primary Examiner—Rodney H. Bonck
Attorney, Agent, or Firm—Basile and Hanlon

[57] ABSTRACT

A pedal actuated caliper brake actuating mechanism for a bicycle having a multi-gear chain drive includes an elongate lever mounted on the bicycle frame for resiliently resisted pivotal movement from a rest position about an axis generally coincident with that of the pedal driven main sprocket. The lever is formed with two upwardly facing abutment surfaces closely spaced from opposite sides of the path of movement of the main sprocket teeth along the lower rear quadrant of the sprocket. An arm pivotally mounted at its lower end on the lever carries a horizontal roller at its upper end which projects above and laterally across both abutment surfaces and the sprocket tooth path. A resilient member fixed at one end to the arm carries a plate at its upper end which projects into the sprocket tooth path at an inclination such that the teeth slide past the plate during forward rotation of the sprocket and positively engage the plate and drive it downwardly upon reverse rotation of the sprocket. Downward movement of the plate pivots the arm to shift the roller below a downwardly moving tooth of the sprocket which in turn drives the roller into engagement with the abutment surfaces of the lever to depress the lever. Depression of the lever first actuates a mechanism to frictionally engage the rear sprocket for minimal rotation relative to the frame and then tensions a cable to apply the brake.

11 Claims, 4 Drawing Sheets

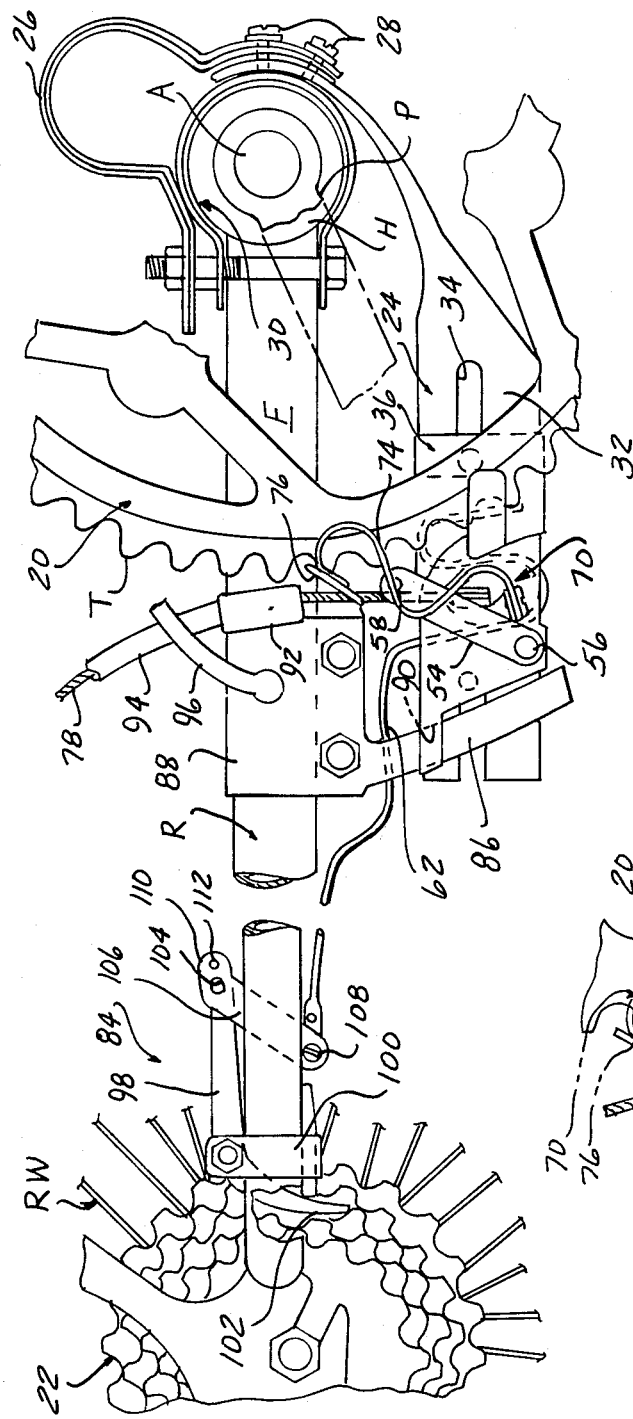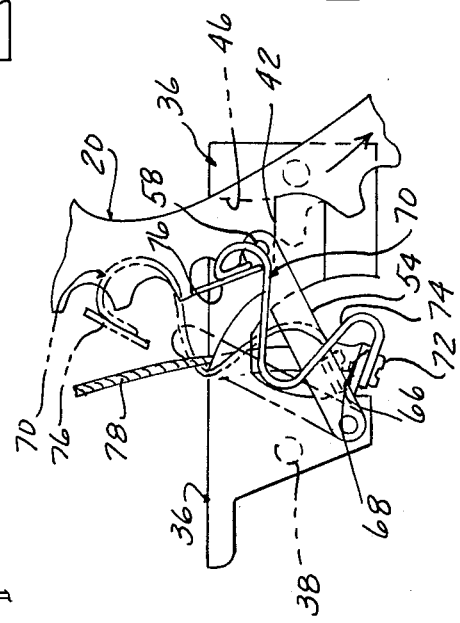
FIG-1
FIG-2

4,856,629

BRAKE ACTUATING MECHANISM FOR BICYCLES WITH MULTI-SPEED CHAIN DRIVE

REFERENCE TO RELATED APPLICATION

This application is a continuation-in-part of my co-pending application Ser. No. 06/433,983, filed Jan. 21, 1983 and now abandoned.

BACKGROUND OF THE INVENTION

Bicycles with multi-speed drives, such as the typical so-called ten speed bicycle, employ a coupling arrangement between the rear sprocket assembly and the rear wheel which transmits only forward rotation of the rear sprocket assembly to the rear wheel. This arrangement precludes the employment of a so-called coaster brake historically used on single speed bicycles in which a reverse rotation of the rear sprocket applies a brake built into the hub of the rear wheel. Bicycles which employ a multi-speed chain and sprocket system almost invariably employ caliper brakes which engage the wheel rims and are actuated, through a cable connection, by a hand lever mounted on the handle bars of the bicycle.

Both the simple pedal actuated coaster brake and the hand lever actuated caliper brake are manually applied by the rider. While the rider may use his entire weight in applying a pedal actuated brake, the maximum brake applying force the rider can apply to a hand lever actuated caliper brake is represented by the strength of the riders hand grip. Because, in an emergency situation, the rider may be required to evasively steer the bicycle while applying the brake, controlled application of the brake by a handle bar mounted hand lever while steering to avoid a collision requires substantial skill on the part of the rider.

This problem has been recognized in the art, and various arrangements for pedal actuated braking systems for multi-speed chain drives have been proposed. Foster U.S. Pat. No. 3,966,229 discloses, in one embodiment, such a system in which a pivoted pawl is held clear of the path of movement of the main sprocket teeth during forward rotation of the main sprocket and is pivoted into underlying engagement with a tooth on the main sprocket upon reverse rotation of that sprocket. The pawl is mounted upon a lever which is driven downwardly by the pawl upon reverse rotation of the main sprocket and this downward movement of the lever is applied to tension the cable(s) of a conventional caliper type brake system.

While the basic concept proposed by Foster of transmitting reverse rotation of a pedal driven sprocket to a lever which will apply a cable actuated brake is feasible, the specific mechanical arrangement for accomplishing this purpose, disclosed in the aforementioned Foster patent, has certain drawbacks. The pawl in the Foster system is positioned by a member which frictionally grips opposed sides of the main sprocket to maintain the pawl in a position clear of the sprocket during forward rotation and to draw the distal end of the pawl toward the path of the main sprocket teeth upon reverse rotation of the main sprocket. Because this member is frictionally engaged with the main sprocket at all times, it is subject to wear which can result in the loosening of the frictional grip of the member upon the sprocket. Because this gripping member engages the smooth sides of the sprocket, shifting of the pawl into engagement with the sprocket teeth is not synchronized with the movement of the sprocket teeth. This can result in the pawl tip striking the tip portion of a sprocket tooth and rebounding away from the sprocket. Further, in order to accommodate entry of the pawl tooth into the space between two teeth of the sprocket, the tip of the pawl must be relatively narrow, and the entire brake applying force exerted by reverse rotation of the sprocket is applied to this relatively narrow tip portion.

These last problems are by the present invention.

SUMMARY OF THE INVENTION

In accordance with the present invention, a brake actuating mechanism for applying a cable actuated bicycle brake in response to a reverse rotation of the pedal driven main sprocket includes a lever which extends generally horizontally rearwardly from a position below the main sprocket hub to a position rearwardly of the periphery of the lower rear quadrant of the sprocket. A pair of arms are located at opposite sides of the lever and are pivotally mounted at their lower ends on the lever. The arms project upwardly and somewhat forwardly from their pivot, to protrude above the top of the lever. A roller is mounted between the upper ends of the arms for rotation about a horizontal axis. The roller extends laterally across the width of the lever and across a vertical slot in the lever through which the main sprocket freely passes during rotation. A curved spring is coupled at one end to the arms and projects generally vertically upwardly from the arms above the level of the roller. At the upper end of the curved spring, an inclined plate is mounted to project into the path of the teeth of the main sprocket at an inclination such that forward rotation of the main sprocket causes the teeth to slip freely past the inclined plate, which is resiliently biased toward the path of the sprocket by the curved spring member. Upon reverse rotation of the main sprocket, the upper edge of the plate is engaged by a downwardly moving tooth of the main sprocket, and this downward movement is resiliently transmitted by the curved spring to the arms to pivot the upper end of the arms toward the main sprocket to insert the roller into underlying relationship with a downwardly moving tooth of the main sprocket. The tooth which engages the arm carried roller drives the arm carried roller downwardly until the roller engages upwardly facing abutment surfaces on the lever. Reverse rotation of the sprocket transmitted by the roller to the lever will cause the lever to move downwardly and this downward movement, after a predetermined initial movement will apply tension to a cable coupled to the lever to apply a caliper type brake, or other type brake which may be actuated by a cable or similar manner.

A certain amount of lost motion is employed in the coupling of the cable to the lever so that prior to application of the brake, a pawl located adjacent the rear sprocket assembly may be operated to contact the rear sprocket assembly in a clutch-like manner acting to restrain hub rotation relative to the bicycle frame. The clutch-like operation of the pawl is such that minimal hub rotation is allowed in cases where the derailer has insufficient slack to allow back pedaling required to fully actuate braking. These conditions occur, for instance, when the chain is situated on the largest front and the largest rear sprockets. In such a case, if the rear sprocket is locked, and not allowed to move as in the prior art, an interruption of braking may occur. Actuation of the rear sprocket engaging pawl is accomplished by a linkage resiliently coupled to the lever to actuate the pawl upon initial downward movement of the lever, prior to the taking up of the lost motion in the connection between the brake actuating cable and the lever.

Other objects and features of the invention will become apparent by reference to the following specification and to the drawings.

IN THE DRAWINGS

FIG. 1 is a side elevational view, with certain parts broken away or omitted, showing a brake actuating mechanism embodying the present invention and its association with the main and rear sprocket assemblies of a conventional ten speed bicycle;

FIG. 2 is a side elevational view of a portion of the brake actuating mechanism of FIG. 1 shown in an actuated position;

DESCRIPTION OF THE PREFERRED EMBODIMENT

Figure 3:
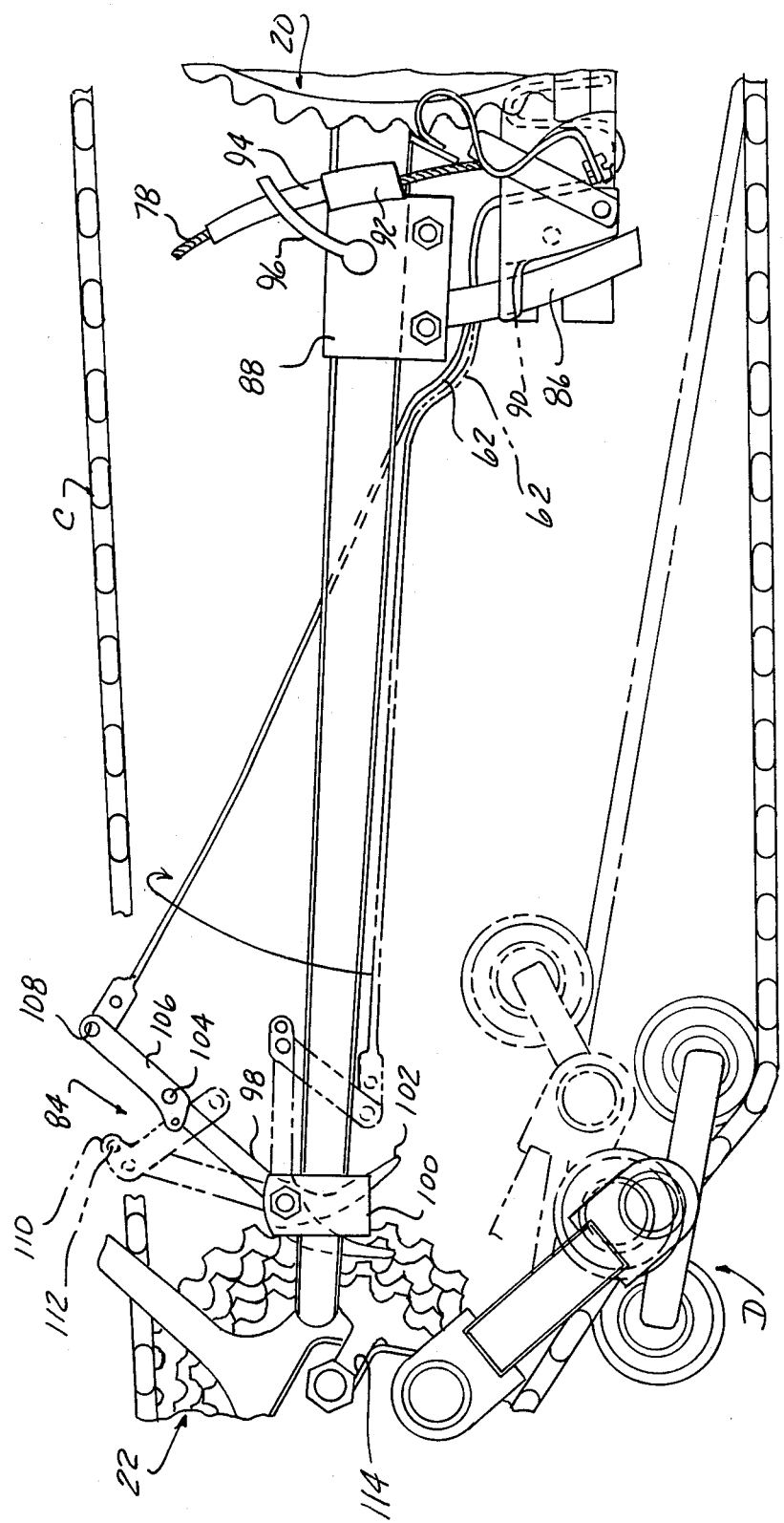
FIG. 3 is a side elevational view, with certain parts broken away or omitted, showing details of the rear sprocket assembly arresting mechanism of the present invention.
Figure 4:
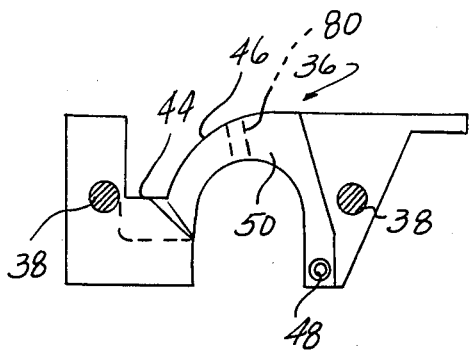
FIG. 4 is a view of the inner side of the brake actuating lever of the mechanism of FIG. 1.

The brake actuating mechanism of the present invention has been designed in a manner such that it may be mounted upon a conventional bicycle without requiring modification of the bicycle itself. Thus, only those portions of a conventional bicycle and its chain drive directly involved with the present invention have been shown in the drawings.

Referring first to FIG. 1, the bicycle frame designated generally F is formed with a hub H which rotatably mounts, in a well known manner, a main sprocket assembly partially shown in FIG. 1 and designated generally 20. Pedal cranks P are rotatably fixed to the main sprocket assembly 20 to drive main sprocket 20 in rotation relative to frame F about a main sprocket axis A. The bicycle frame F includes a rear fork section designated R. At its rearward end (left-hand end as viewed in FIG. 1) the rear fork R mounts in a well known manner a rear sprocket assembly designated generally 22 and a rear wheel RW which is coupled, in a well known manner, to sprocket assembly 22 in a free wheeling relationship in which only forward rotation (clockwise rotation as viewed in FIG. 1) of rear sprocket assembly 22 is transmitted to the rear wheel RW. Such coupling assemblies are well known and widely available.

A brake actuating mechanism operable upon reverse rotation of sprocket 20 in accordance with the present invention includes an elongate rigid lever member designated generally 24. Lever 24 is mounted at its forward end upon frame F by a resilient member 26 fixedly secured at one end to lever 24 as by bolts 28 and fixedly clamped at its opposite end as by a clamp assembly designated generally 30 to the hub of frame F. The specific construction of resilient member 26 may take any of several forms which will resiliently maintain lever 24 in a normal rest position shown in FIG. 1 and support lever 24 for resiliently resisted movement from this normal rest position about a lever axis parallel to and at least approximately coincident with main sprocket axis A.

The main section 32 of lever member 24 is formed with an elongate slot 34 extending forwardly from the rearward end of the lever. Slot 34 enables certain components, to be described below, to be fixedly clamped to lever member 24 at longitudinally adjusted positions on lever 24 to locate these components in their proper position relative to main sprocket 20. These components are best shown in FIGS. 4–8.

Figure 8:
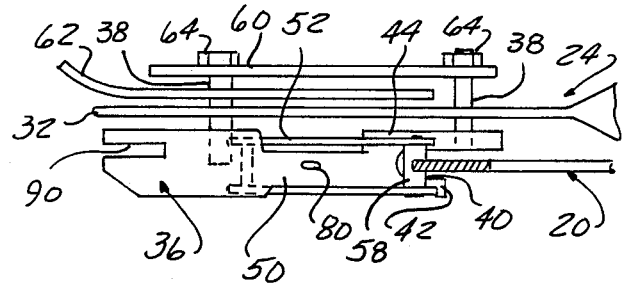
FIG. 8 is a top plan view of a portion of the brake actuating mechanism of FIG. 1, with certain parts omitted, broken away or shown in section and with the parts in a separated, partially assembled relationship.

Referring now to FIG. 8, it is seen that main section 32 of lever 24 lies in a vertical general plane which is parallel to and spaced inwardly from the vertical general plane of sprocket 20. In the plan view of FIG. 8, the various components assembled on lever 24 are spaced from each other in a partially exploded type illustration and the general plane of main section 32 of lever 24 is spaced at a somewhat greater distance from sprocket 20 than it would be in the fully assembled configuration.

A mounting plate designated generally 36 is located at the outer side of main section 32 of lever 24 and, in the final assembled condition of the components of FIG. 8 will lie in the same relationship to sprocket 20 as shown in FIG. 8. A pair of threaded studs 38 are fixedly secured to plate 36 to project from plate 36 through slot 34 in main lever section 32 so that the mounting plate 36 may be clamped against main section 32 of lever 24 in the final assembled position.

As best seen in FIG. 8, mounting plate 36 is formed at its forward end with a forwardly opening vertical slot 40 through which the peripheral portion of main sprocket assembly 20 can freely pass. Upwardly facing abutment surfaces 42 and 44 are formed on mounting plate 36 at opposite sides of slot 40, these surfaces being horizontally aligned with each other and located at the bottom of an upwardly opening recess 46 in plate 36, best shown in FIGS. 4 and 5. A pivot pin receiving bore 48 extends entirely through plate 36 in the lower rear portion of a narrowed width central section 50 of plate 36.

A pair of spaced parallel arms 52, 54 are mounted at their lower ends for pivotal movement at opposite sides of mounting plate 36 by a pivot pin 56 which passes through bore 48. A roller 58 is rotatably mounted between the opposite ends of arms 52, 54. In the assembled position, arm 52 lies within the recess at the inner side of plate 36 defined by narrowed central section 50 as indicated at 53 in FIG. 8, while arm 54 is located adjacent the outer side of plate 36.

A clamping plate 60 is received on studs 38 at the opposite side of main section 32 of lever 24 from mounting plate 36. An arresting device actuator member 62 is clamped firmly between lever 24 and clamping plate 60 when nuts 64 threaded onto studs 38 are tightened down to clamp mounting plate 36, lever 24, actuator 62 and clamping plate 60 in firm face-to-face engagement with each other.

Figure 5:
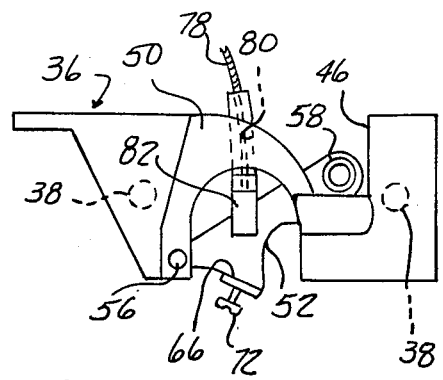
FIG. 5 is an outer side view of the lever, showing its relationship to other elements of the actuating mechanism.
Figure 6:
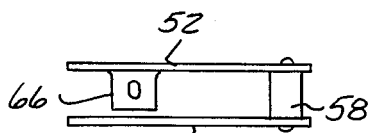
FIG. 6 is a top plan view of a pivoted arm employed in combination with the lever of FIGS. 4 and 5.
Figure 7:
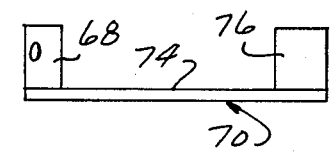
FIG. 7 is a top plan view of an arm positioning member employed in combination with the arm of FIG. 6.

As best seen in FIG. 6, arm 52 is formed with a mounting pad 66 to which a plate-like base 68 (FIG. 7) of an actuator member designated generally 70 may be fixedly secured as by a mounting screw 72 (FIG. 5).

Referring now particularly to FIGS. 1 and 2, actuating member 70 includes a resilient sinuous member 74 fixedly secured at one end to base 68 and fixedly mounting, at its upper end, a threader plate 76. As best seen in FIG. 1, plate 76 is biased by the resilient member 74 to a position wherein plate 76 is inclined upwardly and inwardly across the paths of the tops of sprocket teeth T. Upon forward (clockwise as viewed in FIG. 1) rotation of main sprocket 20, the upwardly moving sprocket teeth can slide upwardly past threader plate 76, the resilient member 74 permitting the necessary outward deflection of plate 76 to permit the sprocket teeth to pass upwardly past the plate. While this condition occurs, the teeth T of sprocket 20 act through resilient member 74 to position the arms 52, 54 in the upwardly inclined position shown in FIG. 1 in which the roller 58 which extends between the two arms is maintained clear of the path of movement of the sprocket teeth.

If, however, the direction of rotation of sprocket 20 is reversed, the situation shown in FIG. 2 will occur. Plate 76 will be engaged underneath a downwardly moving tooth of sprocket 20 and because of the direction of inclination of plate 76, the plate will be driven downwardly by the downwardly moving sprocket tooth so that its upper end rests against the sprocket tooth and a portion of its lower end rests agains the next lower sprocket tooth. This configuration will act to prevent plate 76 from slipping out of disengagement with the sprocket before the brake is actuated. This downward movement of plate 76 is transmitted by the resilient member 74 to the arms 52, 54 to cause the arms to pivot downwardly about pivot pin 56 from the position shown in FIG. 1 to thereby move the roller 58 into underlying relationship with the sprocket tooth immediately below the tooth engaged by plate 76.

The axial extent of roller 58 is such that it bridges the slot 40 (FIG. 8) in mounting plate 36 and downward movement of roller 58, when engaged by sprocket 20, will drive the arms 52, 54 downwardly until they engage the abutment surfaces 42, 44 at the opposite sides of slot 40. Further downward movement of roller 58 will cause a downward pivoting movement of lever 24 about the axis of the main sprocket. This downward pivoting movement of lever 24 is employed to tension a brake actuating cable 78 of a conventional caliper brake. This roller/arm configuration which bridges slot 40 allows braking force exerted by the rider to be more directly transmitted to the brake actuating cable 78, thus avoiding the inherent weakness of requiring a single pawl to transmit the full braking force through its pivot, as in prior art designs.

By transmitting the brake applying force from the sprocket tooth to the roller 58 and thence directly to the lever, more of the actuating force is applied to the pivoted arms and even the most violent actuating force is easily absorbed by the roller. The geometrical relationship between the plate 76, arms 52, 54, roller 58 and the sprocket teeth assure seating of the roller into position between two sprocket teeth.

As best seen in FIGS. 5 and 8, brake actuating cable 78 passes freely downwardly through a bore 80 in mounting plate 36 and an enlarged abutment member 82 fixedly mounted on the lower end of cable 78 limits upward movement of the lower end of the cable relative to lever 24. Abutment 82 is so located on cable 78 that when the brakes are unactuated and lever 24 is in its normal rest position, a predetermined downward movement of lever 24 is required before abutment 82 is engaged to start to apply brake actuating tension to cable 78. This lost motion interconnection between lever 24 and cable 78 permits, at the initiation of brake actuation, the engagement of an arresting device designated generally 84 with rear sprocket assembly 22 prior to brake application.

Referring now particularly to FIGS. 1 and 3, to limit lateral deflection of the distal end of lever 24, a rigid lever guide finger 86 is mounted upon rear fork R of the bicycle frame, as by a clamp 88, to be slidably received in a slot 90 (best shown in FIG. 8) formed in mounting plate 36. Clamp 88 also mounts a tubular cable guide member 92, through which cable 78 is freely slidable; the cable guide 92 being secured, as by welding, to clamp 88. Guide 92 also serves as a seat for the lower end of a cable sheath 94. A deformable cable sheath clip 96 may also be fixedly mounted on clamp 88 to assure clearance of cable and sheath from sprocket 20.

Figure 9:
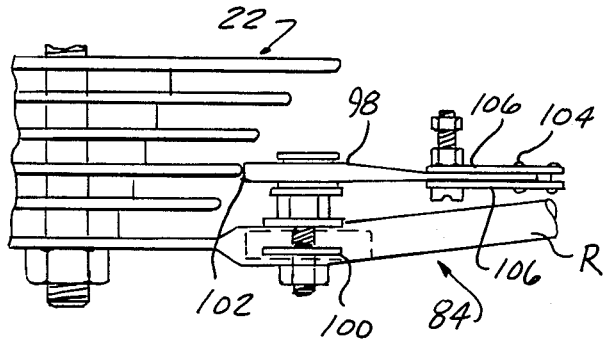
FIG. 9 is a top plan view of the rear sprocket arresting mechanism of FIG. 3, again with certain parts broken away or omitted.

Referring now particularly to FIGS. 1, 3 and 9, the rear sprocket arresting device 84 includes a bell crank like pawl 98 which is supported for pivotal movement relative to the bicycle frame upon a clamp 100 attached to rear fork R. Pawl 98 is formed at one end with a downwardly oriented friction surface 102, aligned with one of the sprockets of rear sprocket assembly 22, as best seen in FIG. 9. The opposite end of pawl 98 is coupled by means of a pivot pin 104 to a pair of links 106, one on each side of pawl 98, whose opposite ends are pivotally interconnected by pin 108 to the end of the arresting device actuator 62. Links 106 are formed with a projecting toe portion 110 adjacent pivot pin 104 and a laterally extending stop pin 112 is mounted at the tip of this portion to limit pivotal movement of links 106 relative to pawl 98.

Referring now particularly to FIG. 1, when lever 24 is in its normal rest position, the arresting device actuator 62 positions pawl 98 in the position shown in FIG. 1, in which the friction surface of pawl 102 is clear of the path of movement of the particular sprocket of rear sprocket assembly 22 with which it is aligned. Movement of lever 24 downwardly from the rest position shown in FIG. 1, at the initiation of a brake application, carries with it actuating member 62 which upon downward movement rotates pawl 98 in a clockwise direction as viewed in FIG. 1 to swing the friction surface 102 into engagement with the top surfaces of the sprocket teeth with which it is aligned. Engagement of friction surface 102 of pawl 98 with the rear spocket assembly 22 will prevent reverse rotation of the rear sprocket assembly 22. Continued braking following arresting of the rear sprocket assembly 22 will allow the upper run of the drive chain C to become slack, thus insuring that the front sprocket 20 will always be movable in a forward, clockwise direction, to allow the rider ease in resuming pedaling.

To accommodate removal of the rear wheel without dismounting arrest mechanism 84, the linkage may be manually shifted to the full line position shown in FIG. 3 so that the rear wheel axle can be withdrawn from the frame via slot 114 with pawl tooth 102 in a position clear of the withdrawal movement of its aligned sprocket.

Figures 10, 11:
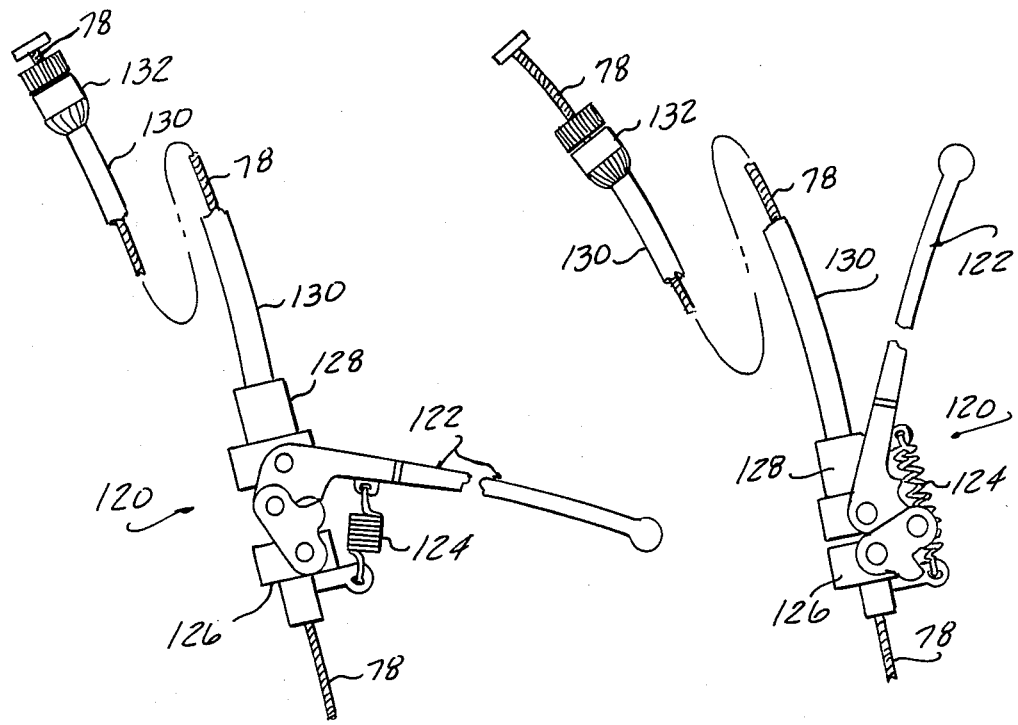
FIG. 10 is a side elevational view of the safety device in its normal open position.
FIG. 11 is a side elevational view of the safety device in its actuated position.
Figure 12:
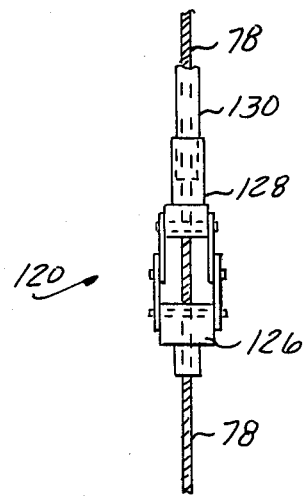
FIG. 12 is a top plan view of the safety device in its normal, open position showing the relationship of the two bases.
Figure 13:
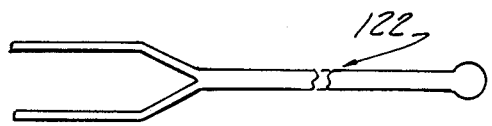
FIG. 13 is a top view of the safety device actuating handle.

Referring now particularly to FIGS. 10–13, a safety device designated generally as 120, is employed to elongate the brake actuating cable 78 and free the brake caliper, in the event that the calipers remain closed following braking. In its normal position, handle 122 is held in the down position, shown in FIG. 10, by the force exerted through pretensioned spring member 124. In this, normal position, the base 126 and sheath support 128 are held apart. To actuate the device, see FIG. 11, the handle 122 is pulled up toward the rider and against the force of spring 124. In this position, base 126 and sheath support 128 are moved toward one another and, in effect, shorten the length of the sheath segment 130 between the safety device and the brake caliper. The effect of this movement is to lengthen the braking cable 78 relative to the sheath 130, at the point of caliper connection, thus effectively releasing a blocked brake. Following brake release, handle 122 returns to its normal position, biased by spring 124. The form of connection 132, shown in FIGS. 10 and 11, is strictly for representative purposes only, and is not intended to restrict the form of cable connections available.

While one embodiment of the invention has been described in detail, it will be apparent to those skilled in the art that the disclosed embodiment may be modified. Therefore the foregoing description is to be considered exemplary rather than limiting and the true scope of the invention is that defined in the following claims.

I claim:

1. In a bicycle having a frame, front and rear wheels rotatably mounted on said frame, a pedal driven main sprocket, having sprocket teeth, mounted on said frame for forward and reverse rotation relative to said frame about a main sprocket axis, rear sprocket means coupled to said rear wheel, a chain operatively trained about said main sprocket and said rear sprocket means for transmitting pedal driven rotation of said main sprocket to said rear sprocket means, said rear sprocket means being coupled to said rear wheel to transmit only forward rotation of said main sprocket to said rear wheel, brake means mounted on said frame operable when applied to brake at least the rear wheel of said bicycle, cable means operable when tensioned to apply said brake means, and brake actuating means operable to apply tension to said cable means;

the improvement wherein said brake actuating means comprises a rigid lever having a main section lying in a vertical general plane in adjacent spaced parallel relationship to the general plane of said main sprocket, means mounting one end of said lever upon said frame for resiliently resisted pivotal movement about a lever axis parallel to and adjacent said main sprocket axis from a normally maintained rest position, said lever when in said rest position extending horizontally rearwardly from a front end located below and slightly to the rear of said main sprocket axis to a rear end spaced rearwardly from said main sprocket, a pawl arm mounted at one end on said lever at the side of said main section thereof remote from said main sprocket for pivotal movement relative to said lever about an axis parallel to said main sprocket axis, a roller member mounted on the other end of said arm and projecting horizontally from said arm across the vertical general plane of said main section of said lever above said lever and across the general plane of said main sprocket, pawl actuating means coupled to said pawl arm and slidably engageable with the teeth of said main sprocket operable during forward rotation of said main sprocket to locate said arm in a rest position wherein said roller member is spaced rearwardly of the path of movement of said main sprocket teeth and spaced upwardly from said lever and operable upon reverse rotation of said main sprocket to pivot said arm to an actuated position wherein said roller is engaged beneath a tooth of said main sprocket on the lower rear quadrant of said main sprocket and rests upon the top of said lever rearwardly of said lever axis, and cable tensioning means operable in response to a predetermined downward pivoting movement of said lever from its rest position to apply tension to said cable means.

2. The invention defined in claim 1 further comprising arresting means coupled to said lever operable in response to an initial downward movement of said lever from its rest position to arrest reverse rotation of said rear sprocket means relative to said frame prior to the application of tension to said cable means by said cable tensioning means.

3. The invention defined in claim 2 further comprising means defining a bore spaced rearwardly from said lever axis and extending vertically through said lever to open at its lower end through a downwardly facing abutment surface of said lever, and said cable means comprises a cable end section extending downwardly through said bore to project below said abutment surface, and abutment means of a diameter larger than said bore fixed to the projecting portion of said end section in downwardly spaced relationship to said abutment surface when said lever is in its rest position.

4. The invention defined in claim 1 wherein said pawl actuating means comprises a plate, resilient means fixed to and projecting upwardly from said pawl arm and supporting said plate at the upper end of said resilient means in a position wherein said plate is inclined upwardly and inwardly across the path of movement of said main sprocket teeth at a location on the lower rear quadrant of said main sprocket with an upper edge of said plate projecting into the path of said teeth whereby said teeth slide upwardly across and past the upper edge of said plate during forward rotation of said main sprocket, and a tooth of said sprocket engages the upper edge of said plate and depresses and plate upon reverse rotation of said main sprocket, said resilient means being operable to shift said pawl arm from its rest position to its actuated position in response to depression of said plate.

5. In a bicycle having a frame, front and rear wheels rotatably mounted on said frame, a pedal driven main sprocket having sprocket teeth mounted on said frame for forward and reverse rotation relative to said frame about a main sprocket axis, rear sprocket means coupled to said rear wheel, a chain operatively trained about said main sprocket and said rear sprocket means for transmitting pedal driven rotation of said main sprocket to said rear sprocket means, said rear sprocket means being coupled to said rear wheel to transmit only forward rotation of said main sprocket to said rear wheel, brake means mounted on said frame operable when applied to brake at least the rear wheel of said bicycle, cable means operable when tensioned to apply said brake means, and brake actuating means operable to apply tension to said cable means;

the improvement wherein said brake actuating means comprises an elongate rigid lever mounted at one end on said frame for resiliently resisted pivotal movement from a normal rest position about a lever axis parallel to said main sprocket axis, said one end of said lever being located at one side of said main sprocket below said main sprocket axis and said lever when in said rest position extending generally horizontally rearwardly from said one end to a rearward end spaced rearwardly from said main sprocket, said lever having a forwardly opening main sprocket receiving recess therein defined between a pair of horizontally spaced portions of said lever having horizontally aligned upwardly facing abutment surfaces located at opposite sides of the path of movement of the teeth of said main sprocket, a pair of arms located respectively at opposite sides of said lever, pivot means mounting one end of each of said arms on said lever for pivotal movement relative to said lever about a common arm axis parallel to said lever axis and located rearwardly of and below said abutment surfaces, a roller mounted on and extending between the respective other ends of said arms above said abutment surfaces, resilient arm positioning means mounted on said arm and engageable with the teeth of said main sprocket operable upon forward rotation of said main sprocket to maintain said roller clear of said teeth of said main sprocket and operable upon reverse rotation of said main sprocket to engage said roller between a tooth of said main sprocket and said abutment surfaces to transmit downward movement of the lower rear quadrant portion of said main sprocket during reverse rotation to said lever, and coupling means coupling said cable means to said lever for applying tension to said cable means upon a predetermined downward displacement of said lever from its rest position.

6. The invention defined in claim 5 wherein said resilient arm positioning means comprises a resilient member fixed at one end to at least one of said arms and projecting upwardly from said one end between said arms to an upper end of said resilient member, said resilient member resiliently biasing said plate to a normal rest position wherein said plate is inclined upwardly and inwardly into the path of movement of said teeth of said main sprocket and being operable to resiliently resist movement of said plate outwardly from said main sprocket axis to accommodate sliding movement of said teeth across said plate during forward rotation of said main sprocket and to resiliently maintain said plate in underlying positive engagement with a tooth on said main sprocket during reverse rotation of said main sprocket.

7. The invention defined in claim 6 wherein said resilient member is configured to accommodate resilient deflection only within a vertical general plane normal to said main sprocket axis.

8. The invention defined in claim 5 wherein said coupling means comprises means defining a downwardly facing abutment surface on said lever, means defining a bore extending upwardly through said lever from said downwardly facing abutment surface, said cable means including a cable end portion extending downwardly through said bore and projecting below said downwardly facing abutment surface, and an abutment element operable to prevent upward withdrawal of said end portion from said bore fixed to said cable end portion at a location spaced a predetermined distance below said downwardly facing abutment surface when said lever is in its normal rest position.

9. The invention defined in claim 8 further comprising manually operable means coupled in said cable end portion above said lever for releasing tension in said cable means applied to said cable means by said coupling means.

10. The invention defined in claim 9 wherein said manually operable means comprises a base fixedly mounted on the bicycle frame, means defining a bore extending through said base, said cable means extending through said bore, a cable sheath support mounted above said base, means defining a bore extending through said cable sheath support, said cable means extending through said support, a cable sheath fixedly connected to said support, a handle and cam means movably connected to said base and sheath support said handle and cam means connecting said base and sheath support, said handle and cam means operable to move said base and sheath support relative to one another to effectively change the relationship between said cable and cable sheath ends.

11. The invention defined in claim 5 further comprising pawl means movable mounted on said frame for movement between a normal rest position clear of said rear sprocket means and an engaging position with said rear sprocket means wherein said pawl means is operable through frictional contact to hold said rear sprocket means against rotation relative to said frame, and pawl actuating means coupling said lever to said pawl means to locate said pawl means in its rest position when said lever is in its rest position and to shift said pawl means to said engaging position upon an initial downward displacement of said lever from its rest position less than the downward displacement of said lever required to apply tension to said cable means.

* * * * *